United States Patent
Karpe et al.

(10) Patent No.: US 10,724,418 B2
(45) Date of Patent: Jul. 28, 2020

(54) METHOD AND A SYSTEM FOR DETERMINING A FLOW RESISTANCE ACROSS A PARTICULATE FILTER

(71) Applicant: Scania CV AB, Södertälje (SE)

(72) Inventors: Niklas Karpe, Täby (SE); Krister Pettersson, Katrineholm (SE); Robert Svensson, Gnesta (SE)

(73) Assignee: Scania CV AB, Södertälje (SE)

( * ) Notice: Subject to any disclaimer, the term of this patent is extended or adjusted under 35 U.S.C. 154(b) by 130 days.

(21) Appl. No.: 15/542,731

(22) PCT Filed: Jan. 18, 2016

(86) PCT No.: PCT/SE2016/050026
§ 371 (c)(1),
(2) Date: Jul. 11, 2017

(87) PCT Pub. No.: WO2016/133443
PCT Pub. Date: Aug. 25, 2016

(65) Prior Publication Data
US 2018/0087431 A1 Mar. 29, 2018

(30) Foreign Application Priority Data
Feb. 17, 2015 (SE) ...................... 1550173

(51) Int. Cl.
*F01N 11/00* (2006.01)
*F01N 3/20* (2006.01)
(Continued)

(52) U.S. Cl.
CPC ............ *F01N 11/002* (2013.01); *F01N 3/021* (2013.01); *F01N 3/035* (2013.01); *F01N 3/2066* (2013.01);
(Continued)

(58) Field of Classification Search
CPC .............. F01N 2560/08; F01N 11/002; F01N 13/0097; F01N 2550/04
See application file for complete search history.

(56) References Cited

U.S. PATENT DOCUMENTS 4,790,192 A * 12/1988 Knecht ................. G01L 9/0054
338/4
6,192,676 B1 * 2/2001 Zurbig .................. F01N 3/2066
60/286
(Continued)

FOREIGN PATENT DOCUMENTS

JP          2001020724 A  *  1/2001
WO          9403711 A1      2/1994
WO      WO-2013074022 A1 *  5/2013  ............. F01N 11/00

OTHER PUBLICATIONS

Swedish Office Action for Swedish Patent Application No. 1550173-7 dated Jun. 27, 2018.
(Continued)

*Primary Examiner* — David A Rogers
(74) *Attorney, Agent, or Firm* — Moore & Van Allen PLLC; W. Kevin Ransom

(57) ABSTRACT

A method of determining a flow resistance across a particulate filter located downstream of an internal combustion engine in an exhaust system. The method comprises measuring a first differential pressure across the particulate filter, measuring a second differential pressure downstream of the particulate filter, determining a pressure ratio of the first differential pressure and the second differential pressure, and from said pressure ratio, determining a flow resistance across the particulate filter. The second differential pressure is measured across a selective catalytic reduction system.

12 Claims, 2 Drawing Sheets

(51) Int. Cl.
 *F01N 3/035* (2006.01)
 *F01N 3/021* (2006.01)
 *F01N 9/00* (2006.01)
 *F01N 13/00* (2010.01)
 *G01F 1/34* (2006.01)
 *G01N 15/08* (2006.01)

(52) U.S. Cl.
 CPC ............ *F01N 9/002* (2013.01); *F01N 9/007* (2013.01); *F01N 13/009* (2014.06); *G01F 1/34* (2013.01); *G01N 15/0826* (2013.01); *F01N 2560/07* (2013.01); *F01N 2560/08* (2013.01); *F01N 2900/0416* (2013.01); *F01N 2900/1606* (2013.01); *G01N 2015/084* (2013.01); *Y02A 50/2325* (2018.01); *Y02T 10/24* (2013.01); *Y02T 10/47* (2013.01)

(56) References Cited

U.S. PATENT DOCUMENTS

| | | | | |
|---|---|---|---|---|
| 7,980,060 | B2* | 7/2011 | Tachimoto | F01N 9/002 60/277 |
| 8,640,445 | B2* | 2/2014 | Garimella | F01N 3/208 60/274 |
| 9,366,171 | B2* | 6/2016 | Li | F01N 3/106 |
| 9,440,194 | B2* | 9/2016 | Irisawa | F01N 3/021 |
| 9,765,674 | B2* | 9/2017 | Khaled | F01N 13/0093 |
| 9,879,586 | B2* | 1/2018 | Hagimoto | F01N 3/023 |
| 2003/0019276 | A1* | 1/2003 | Ericson | A61M 1/16 73/1.57 |
| 2003/0225506 | A1 | 12/2003 | Plote et al. | |
| 2004/0206069 | A1* | 10/2004 | Tumati | F01N 3/025 60/285 |
| 2005/0005695 | A1* | 1/2005 | Corey | G01P 5/14 73/170.14 |
| 2007/0175204 | A1* | 8/2007 | Shirai | B01D 53/9431 60/286 |
| 2007/0181127 | A1* | 8/2007 | Jin | A61M 16/08 128/204.21 |
| 2010/0043404 | A1* | 2/2010 | Hebbale | F01N 9/00 60/286 |
| 2010/0242864 | A1* | 9/2010 | Tanoura | B01D 53/9459 123/3 |
| 2011/0137538 | A1* | 6/2011 | Zanetti | F01N 11/005 701/102 |
| 2012/0216510 | A1* | 8/2012 | Xu | B01D 53/9431 60/274 |
| 2013/0125524 | A1* | 5/2013 | Plummer | F01N 3/0256 60/39.5 |
| 2013/0199160 | A1 | 8/2013 | Kruer et al. | |
| 2014/0023576 | A1* | 1/2014 | Yezerets | B01D 46/0086 423/213.2 |
| 2014/0030175 | A1* | 1/2014 | Hersel | F01N 3/208 423/212 |
| 2014/0033678 | A1* | 2/2014 | Swoish | F01N 11/00 60/274 |
| 2014/0260209 | A1* | 9/2014 | Goss | F01N 3/2803 60/295 |
| 2014/0290217 | A1* | 10/2014 | Stenlaa | F01N 11/00 60/274 |
| 2015/0098870 | A1* | 4/2015 | Lambert | B01J 29/80 422/168 |
| 2017/0292432 | A1* | 10/2017 | Hall | B01D 53/9418 |

OTHER PUBLICATIONS

Korean Office Action for Korean Patent Application No. 10-2017-7020241 dated Oct. 15, 2018.
International Search Report for PCT/SE2016/050026 dated Apr. 19, 2016.
Written Opinion of the International Searching Authority for PCT/SE2016/050026 dated Apr. 19, 2016.
Scania CV AB, Swedish Application No. 1550173-7, Office Action, dated Oct. 9, 2015.
Scania CV AB, International Application No. PCT/SE2016/050026, International Preliminary Report on Patentability, dated Aug. 22, 2017.

* cited by examiner

METHOD AND A SYSTEM FOR DETERMINING A FLOW RESISTANCE ACROSS A PARTICULATE FILTER

CROSS-REFERENCE TO RELATED APPLICATION(S)

This application is a national stage application (filed under 35 § U.S.C. 371) of PCT/SE16/050026, filed Jan. 18, 2016 of the same title, which, in turn claims priority to Swedish Application No. 1550173-7, filed Feb. 17, 2015 of the same title; the contents of each of which are hereby incorporated by reference.

FIELD OF THE INVENTION

The invention relates to a method, system, computer program product, electronic control unit, and a motor vehicle for determining a flow resistance across a particulate filter in an exhaust system.

BACKGROUND OF THE INVENTION

Internal combustion engines, and particularly diesel engines, produce a variety of different particles during combustion. The reason for this is mainly incomplete combustion of the fuel/air mixture and the type of particles produced vary depending on the fuel used and the type of engine. Since soot and other particles from internal combustion engines are generally harmful and contribute to the particulate matter pollution in the air, many jurisdictions apply increasingly strict emission regulations in order to minimize the emissions of particulate matter from internal combustion engines. One way of reducing the emissions is to fit a particulate filter in an exhaust system of the internal combustion engine. Such a filter may efficiently remove particulate matter from the exhaust gas of the engine. However, the filter becomes clogged with soot over time, such that the flow resistance across the filter increases. It is therefore common to regenerate the filter from time to time by increasing the temperature so that clogging soot particles are burnt off.

The necessity to regenerate the particulate filter may for example be determined by studying the flow resistance across the filter. The flow resistance is commonly given by combining the results of a pressure measurement across the filter and an estimation of the volume flow of exhaust gases through the filter. However, the volume flow of exhaust gases across the filter is difficult to estimate accurately due to leakage, temperature variations, evaporation, etc., and large flow variations over time due to e.g. varying throttle actuation and turbulent flows.

DE 4226055 discloses a method of determining a flow resistance across a particulate filter in an exhaust system, in which a first pressure sensing device is used to measure a first differential pressure across the particulate filter, and a second pressure sensing device is used to measure a second differential pressure across a cross-sectional reduction of the exhaust system downstream of the particulate filter. The first and the second differential pressures are used to determine a pressure ratio, which is compared to a threshold value. A filter regeneration is initiated if the difference between the threshold value and the pressure ratio is smaller than a predetermined setpoint.

However, a problem with the method as disclosed in DE 4226055 is that it requires a cross sectional reduction in the exhaust system across which the second differential pressure can be measured. Such a cross sectional reduction increases the flow resistance in the entire exhaust system and is therefore not desirable, since generally a low flow resistance of the system is needed to e.g. determine the flow resistance across the filter. Furthermore, a high flow resistance in the exhaust system may lead to increased fuel consumption.

SUMMARY OF THE INVENTION

It is an object of the present invention to overcome the above mentioned problem and provide a method and a system by means of which the flow resistance across a particulate filter may be determined without special arrangements, such as cross sectional reductions, in the exhaust system.

This object is, according to a first aspect of the present invention, achieved by the method as initially defined. The method is characterized in that the second differential pressure $\Delta P_2$ is measured across a selective catalytic reduction (SCR) system. An SCR system is used to reduce nitrogen oxide (NOx) emissions and is needed to comply with emission regulations in many jurisdictions. The inventive method is based on the realization that the pressure drop, or differential pressure, across the SCR system is of the same order as the pressure drop across the particulate filter. It is therefore possible to use the SCR system as a reference for determining the flow resistance of the particulate filter. The first differential pressure across the particulate filter gives an instant measure of the filter status, and the second differential pressure gives an instant estimate of the volume flow of exhaust gas through the exhaust system, since the flow resistance of the SCR system is reasonably constant over time.

According to one embodiment of the present invention, the first differential pressure and the second differential pressure are measured simultaneously. This enables an accurate determination of the flow resistance across the particulate filter. The simultaneous measurement of the first and the second differential pressure is also useful to find favorable circumstances with high volume flows through the exhaust system for determining the flow resistance across the particulate filter.

According to another embodiment of the present invention, the first differential pressure and the second differential pressure are measured using a single pressure sensing device. By using a single pressure sensing device, potential distortions affecting the pressure sensing device influence the measurement of the first differential pressure as well as the second differential pressure. Errors in the estimated volume flow in the exhaust system can thereby easily be compensated for.

According to another embodiment of the present invention, the method further includes the step:
determining if a flow of exhaust gas through the exhaust system exceeds a predetermined threshold value,
wherein the step of determining a flow resistance is performed only when said threshold value is exceeded. The flow resistance can in this way be determined very accurately, since it is only determined under favorable circumstances.

According to another embodiment of the present invention, the second differential pressure is used in the step of determining if the flow of exhaust gas through the exhaust system exceeds a predetermined threshold value. This enables fast and accurate estimation of the volume flow of exhaust gas through the exhaust system.

According to another embodiment of the present invention, the determined flow resistance is tested against an error criterion, and, given that the error criterion is fulfilled, an error code is generated. The error criterion can e.g. be set so that error codes are generated if the flow resistance is such that it indicates either clogging of the particulate filter or cracks in the particulate filter. The error code can in this way be used to determine whether the filter needs to be regenerated, or if it necessary to change filters.

According to another embodiment of the present invention, the error criterion is fulfilled if the determined flow resistance exceeds a predetermined upper threshold value or falls below a predetermined lower threshold value. Using a threshold value is a simple and direct way of setting an error criterion.

According to another aspect of the present invention, the above mentioned object is fulfilled by a system as initially defined, which is characterized in that the pressure sensing means for determining a second differential pressure is configured to measure the second differential pressure across a selective catalytic reduction system. The advantages of such a system as well as preferred embodiments thereof are apparent from the above discussion relating to the proposed method.

According to one embodiment of this second aspect of the invention, the pressure sensing means comprises a single pressure sensing device configured to measure the first differential pressure and the second differential pressure.

Other advantageous features as well as advantages of the present invention will appear from the following description.

BRIEF DESCRIPTION OF THE DRAWINGS

The invention will in the following be further described by means of example with reference to the appended drawings, wherein.

DETAILED DESCRIPTION OF THE INVENTION

Figure 1:
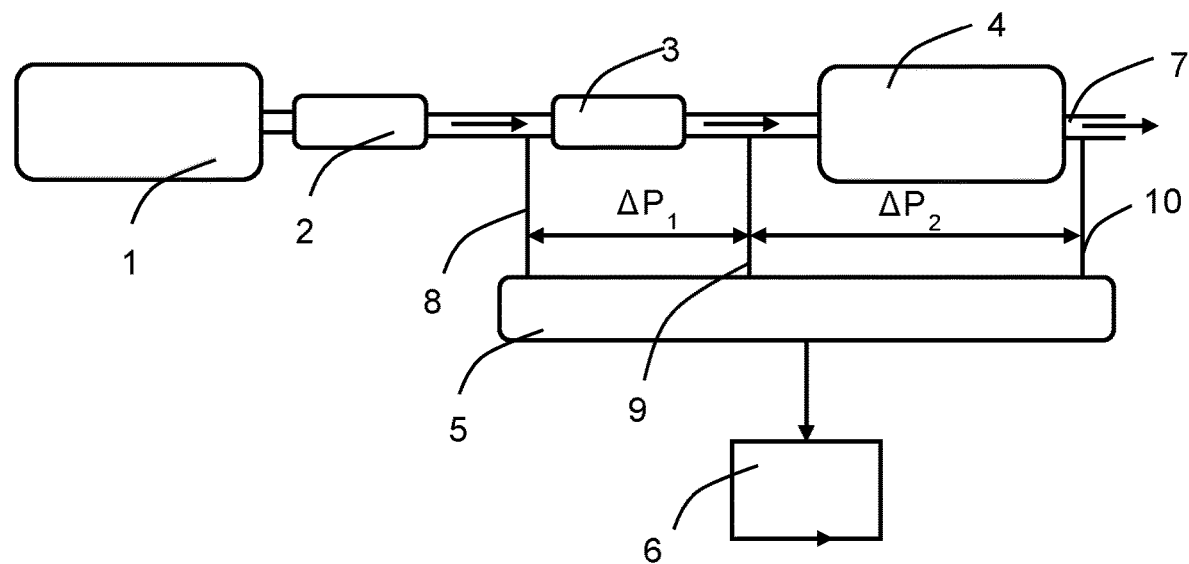
FIG. 1 shows a schematic drawing of an exhaust system including a system according to an embodiment of the invention.

An exhaust system of an internal combustion engine 1 in a motor vehicle is schematically shown in FIG. 1. The exhaust system comprises a diesel oxidation catalyst unit 2, a particulate filter 3 located downstream of the oxidation catalyst unit 2, and further a selective catalytic reduction (SCR) system 4 downstream of the particulate filter 3. The exhaust system further comprises pressure sensing means in the form of a differential pressure sensor 5. The differential pressure sensor 5 is configured to simultaneously measure a first differential pressure $\Delta P_1$ across the particulate filter 3 and a second differential pressure $\Delta P_2$ across the SCR system 4. For this purpose, the pressure sensor 5 has pressure inlet ports 8, 9, 10 located upstream the particulate filter 3, between the particulate filter 3 and the SCR system 4, and downstream the SCR system 4, respectively. Processing means in the form of a processing unit 6 is connected to the differential pressure sensor 5. The processing unit 6 is configured to calculate a pressure ratio $\Delta P_1/\Delta P_2$ and, based on said pressure ratio, a flow resistance R across the particulate filter 3, which is related to the pressure ratio as $R=k \cdot \Delta P_1/\Delta P_2$, wherein k is a constant. During operation of the internal combustion engine 1, exhaust gases are generated and follow the direction of the arrows through exhaust system before being emitted through an exhaust pipe 7.

Figure 2:
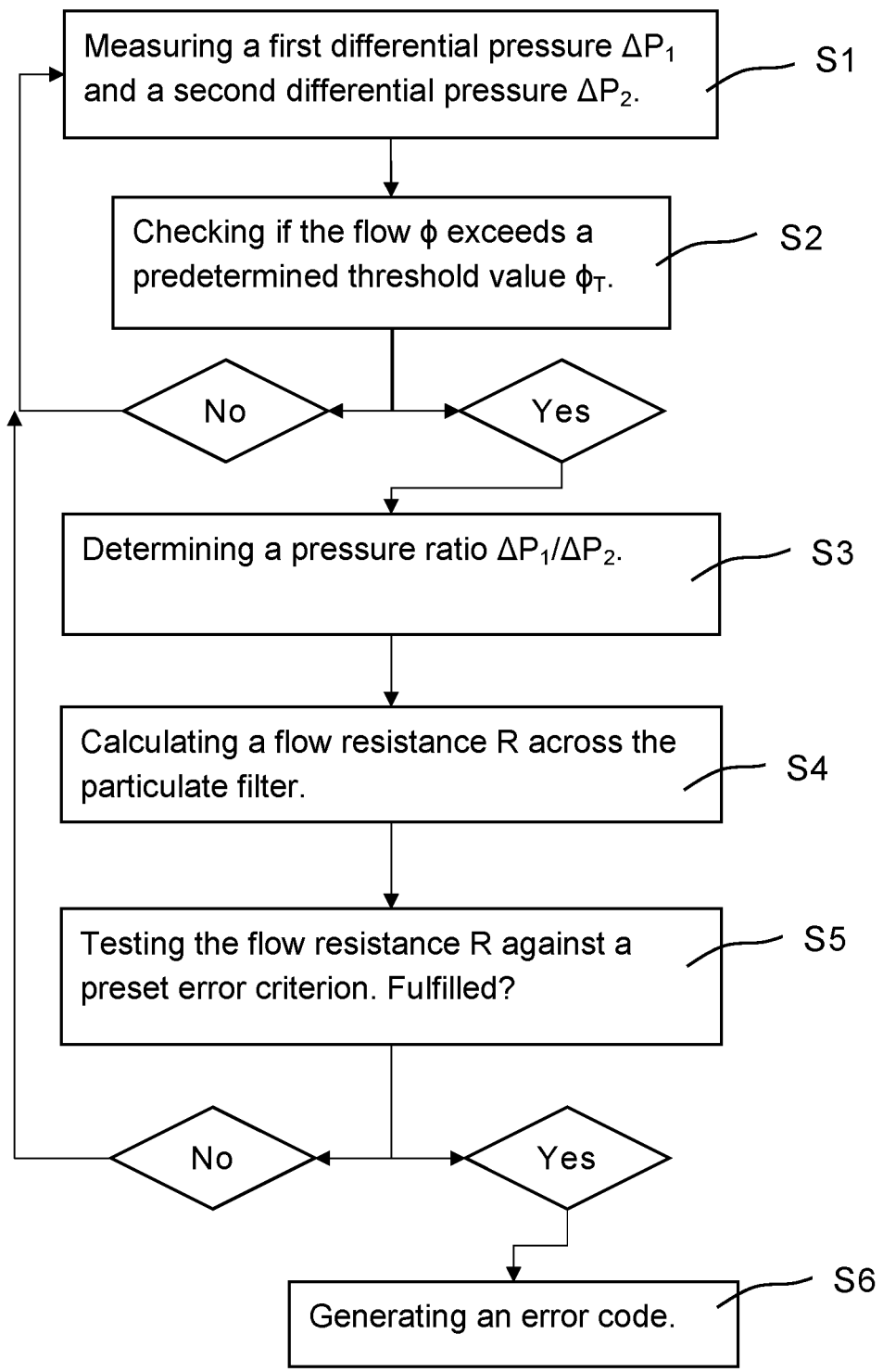
FIG. 2 shows a flow chart of a method according to an embodiment of the invention.

The flow chart in FIG. 2 illustrates a method according to an embodiment of the invention. Using the differential pressure sensor 5, the first differential pressure $\Delta P_1$ across the particulate filter 3 and the second differential pressure $\Delta P_2$ across the SCR system 4 are measured simultaneously in a step S1. In a step S2, it is checked whether the volume flow $\phi$ of exhaust gas through the exhaust system exceeds a predetermined threshold value $\phi_T$. This determination is performed using the second differential pressure $\Delta P_2$ across the SCR system 4, which is proportional to the flow $\phi$. If it is determined that the flow $\phi$ exceeds the predetermined threshold value $\phi_T$, the pressure ratio $\Delta P_1/\Delta P_2$ is determined in a step S3 using the processing unit. From the pressure ratio $\Delta P_1/\Delta P_2$, the flow resistance R across the particulate filter 3 is calculated in a step S4.

If the flow $\phi$ of exhaust gas is lower than the predetermined threshold value $\phi_T$, no determination of the pressure ratio $\Delta P_1/\Delta P_2$ is carried out until the flow exceeds the threshold value.

Once the flow resistance R across the particulate filter 3 has been calculated, it may be tested against a preset error criterion in a step S5. Given that the error criterion is fulfilled, an error code is generated in a step S6. The error criterion may be set such that it is fulfilled if the determined flow resistance R exceeds a predetermined upper threshold value $R_U$, indicating that the particulate filter 3 is clogged, or falls below a predetermined lower threshold value $R_L$, indicating that there are e.g. cracks in the particulate filter 3. Different error codes are generated depending on the outcome of the testing against the error criterion. The error code may in case of a clogged particular filter 3 e.g. trigger a regeneration process, or in the case of a cracked filter trigger generation of an alarm signal, alerting a driver of a vehicle in which the exhaust system is located that the particulate filter 3 needs to be changed. Data relating to the flow resistance may also be saved in a database for later reference.

The system according to the invention may also comprise separate pressure sensing devices for sensing the differential pressures $\Delta P_1$ and $\Delta P_2$, respectively. The pressure sensing means may comprise any kind of known pressure sensing device suitable for measuring differential pressures under the conditions applicable in exhaust systems. It is preferable, but not necessary, that the measurements of the differential pressures $\Delta P_1$ and $\Delta P_2$ are performed simultaneously, since this ensures that the conditions under which the flow resistance R is determined are equivalent to those under which the volume flow $\phi$ of exhaust gas is determined. The pressure sensing device used to determine the second differential $\Delta P_2$ in the shown embodiment has pressure inlet ports 9, 10 located upstream and downstream the SCR system 4. However, the pressure inlet port located downstream the SCR system 4 may be substituted for an atmospheric pressure inlet port.

Figure 3:
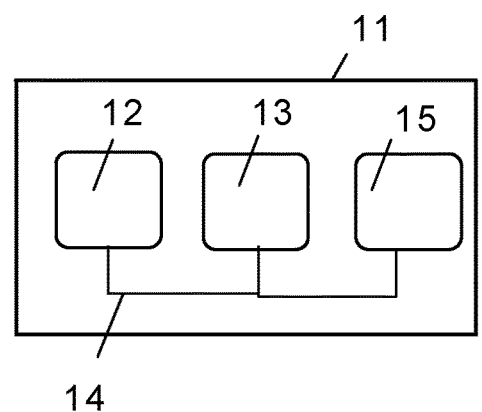
FIG. 3 shows a schematic drawing of a control unit for implementing a method according to the invention.

FIG. 3 illustrates very schematically an electronic control unit 11 comprising an execution means 12, such as a central processor unit (CPU), for executing a computer program. The execution means 12 communicates with a memory 13, for example of the type RAM, through a data bus 14. The control unit 11 also comprises a non-transitory data storing medium 15, for example in the form of a Flash memory or a memory of the type ROM, PROM, EPROM or EEPROM.

The execution means 12 communicates with the data storing medium 15 through the data bus 14. A computer program comprising computer program code for implementing a method according to the invention is stored on the data storing medium 15.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. An electronic implemented method of determining a flow resistance across a particulate filter in an exhaust system, which particulate filter is located downstream of an internal combustion engine, the method comprising:
   measuring, via pressure sensing device, a first differential pressure across the particulate filter;
   measuring, via pressure sensing device, a second differential pressure downstream of the particulate filter across a selective catalytic reduction system;
   determining, via an electronic control unit, a pressure ratio of the first differential pressure and the second differential pressure;
   determining, via an electronic control unit, if a flow of exhaust gas through the exhaust system exceeds a predetermined threshold value; and
   when said threshold value is exceeded, determining, via an electronic control unit, from said pressure ratio, a flow resistance across the particulate filter.

2. The method according to claim 1, wherein the first differential pressure and the second differential pressure are measured simultaneously.

3. The method according to claim 2, wherein the first differential pressure and the second differential pressure are measured using a single pressure sensing device.

4. The method according to claim 1, wherein the second differential pressure is used in the step of determining if the flow of exhaust gas through the exhaust system exceeds a predetermined threshold value.

5. The method according to claim 1, wherein the determined flow resistance is tested against an error criterion, and, given that the error criterion is fulfilled, an error code is generated, via an electronic control unit.

6. The method according to claim 5, wherein the error criterion is fulfilled if the determined flow resistance exceeds a predetermined upper threshold value or falls below a predetermined lower threshold value.

7. A system for determining a flow resistance across a particulate filter in an exhaust system, which particulate filter is located downstream of an internal combustion engine, the system comprising:
   pressure sensing means for determining a first differential pressure across the particulate filter and a second differential pressure downstream of the particulate filter across a selective catalytic reduction system;
   processing means configured to determine a pressure ratio of the first differential pressure and the second differential pressure;
   processing means configured to determine if a flow of exhaust gas through the exhaust system exceeds a predetermined threshold value; and
   processing means configured to determine a flow resistance only when said predetermined threshold value is exceeded.

8. The system according to claim 7, wherein the pressure sensing means comprises a single pressure sensing device configured to measure the first differential pressure and the second differential pressure.

9. A computer program product comprising computer program code stored in a non-transitory computer-readable medium readable by a computer, said computer program product used for determining a flow resistance across a particulate filter in an exhaust system, which particulate filter is located downstream of an internal combustion engine, wherein said computer program code comprising computer instructions to cause one or more computer processors to perform the following operations:
   measuring a first differential pressure across the particulate filter;
   measuring a second differential pressure downstream of the particulate filter across a selective catalytic reduction system;
   determining a pressure ratio of the first differential pressure and the second differential pressure;
   determining if a flow of exhaust gas through the exhaust system exceeds a predetermined threshold value; and
   when said threshold value is exceeded, determining from said pressure ratio, a flow resistance across the particulate filter.

10. An electronic control unit of a motor vehicle comprising:
    an execution means;
    a memory connected to the execution means;
    a data storage medium which is connected to the execution means; and
    computer program product comprising computer program code stored in a non-transitory computer-readable medium readable by a computer, said computer program product used for determining a flow resistance across a particulate filter in an exhaust system, which particulate filter is located downstream of an internal combustion engine, wherein said computer program code comprising computer instructions to cause one or more computer processors to perform the following operations:
      measuring a first differential pressure across the particulate filter;
      measuring a second differential pressure downstream of the particulate filter across a selective catalytic reduction system;
      determining a pressure ratio of the first differential pressure and the second differential pressure;
      determining if a flow of exhaust gas through the exhaust system exceeds a predetermined threshold value; and
      when said threshold value is exceeded, determining from said pressure ratio, a flow resistance across the particulate filter.

11. A motor vehicle comprising an electronic control unit, wherein said electronic control unit comprises:
    an execution means;
    a memory connected to the execution means;
    a data storage medium which is connected to the execution means; and
    computer program product comprising computer program code stored in a non-transitory computer-readable medium readable by a computer, said computer program product used for determining a flow resistance across a particulate filter in an exhaust system, which particulate filter is located downstream of an internal combustion engine, wherein said computer program code comprising computer instructions to cause one or more computer processors to perform the following operations:

measuring a first differential pressure across the particulate filter;

measuring a second differential pressure downstream of the particulate filter across a selective catalytic reduction system;

determining a pressure ratio of the first differential pressure and the second differential pressure;

determining if a flow of exhaust gas through the exhaust system exceeds a predetermined threshold value; and when said threshold value is exceeded, determining from said pressure ratio, a flow resistance across the particulate filter.

12. A motor vehicle according to claim 11, wherein the motor vehicle is a truck or a bus.

* * * * *